April 22, 1924.

J. E. McDADE 1,490,934

EDUCATIONAL TEST DEVICE

Filed Feb. 5, 1923

Inventor
James E. McDade
By Leslie W. Fricke
Attorney

April 22, 1924.
J. E. McDADE
1,490,934
EDUCATIONAL TEST DEVICE
Filed Feb. 5, 1923
2 Sheets-Sheet 2
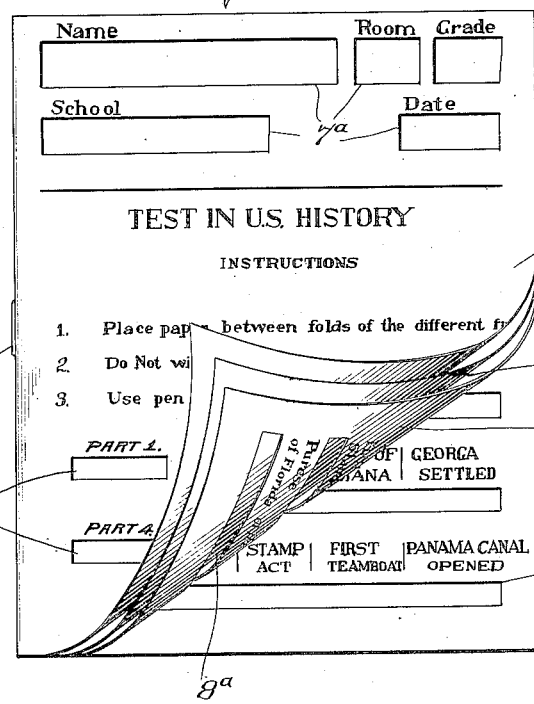
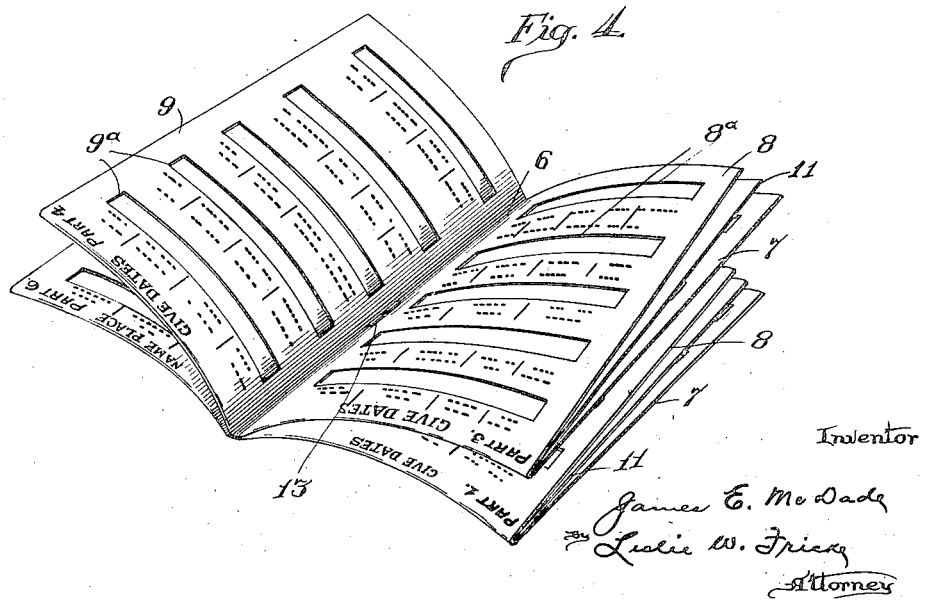

Patented Apr. 22, 1924.

1,490,934

UNITED STATES PATENT OFFICE.

JAMES E. McDADE, OF CHICAGO, ILLINOIS.

EDUCATIONAL-TEST DEVICE.

Application filed February 5, 1923. Serial No. 616,884.

*To all whom it may concern:*

Be it known that I, JAMES E. McDADE, a citizen of the United States, residing at Chicago, in the county of Cook and State of Illinois, have invented certain new and useful Improvements in Educational-Test Devices, of which the following is a specification.

My invention relates to devices adapted for giving an educational test to a number of students simultaneously to ascertain how proficient each student is in the subject forming the basis of the test.

One of the objects of my invention is the provision of a device of simple construction, inexpensive to manufacture, and so arranged that the work sheet on which the answers to the respective test problems are to be written will be maintained in a definite relationship with respect to the test problems. My invention contemplates providing a sheet of material on the face side of which one or more test problems may be printed or written and a work sheet of ordinary paper, in combination with means for maintaining the work sheet against the back of the first named sheet in a definite relationship thereto, the first named sheet having openings adjacent the respective problems whereby the student may insert a pencil point through the openings and write the answers to the respective problems on the work sheet.

A further object of my invention is the provision of a test device so constructed that a large number of test problems may be given the student at one time and the problems concealed until a signal is given by the examiner, this object preferably being accomplished by arranging the sheets of material bearing the test problems like the leaves of a book and placing the work sheets behind the respective first named sheets.

A further object of my invention is the provision of a test device so constructed that both sides of the respective work sheets may be used by the student in writing the answers to the respective problems, or the respective sets of problems, as the case may be, and without the necessity of the student specially handling the work sheets, which may be accomplished by arranging the sheets of material bearing the test problems back to back in pairs and inserting the work sheets between the sheets of the respective pairs.

The invention consists in the novel constructions and arrangements to be hereinafter described and claimed for carrying out the above stated objects and such other objects as will appear from the following description of certain preferred embodiments illustrated in the accompanying drawings, wherein—

Fig. 1 is a plan view of a device embodying the principles of my invention, the lower corners of certain parts thereof having been lifted up and turned back to reveal more clearly the construction of the device;

Fig. 2 is a face view, on a reduced scale, of a sheet of material before it is folded into the form shown in Fig. 1;

Fig. 3 is a view similar to Fig. 1 of a slightly modified construction; and

Fig. 4 is a perspective view of the construction shown in Fig. 3, the device being open and having been turned end for end.

Like characters of reference designate like parts in the several views.

Referring to the accompanying drawings, the test device shown in Figs. 1 and 2 thereof comprises a sheet of material, designated generally by the reference character A and a work sheet on which the student may write the answers to the problems, which is designated generally by the reference character B. The sheet A is folded transversely substantially medially along the line 5 to provide two portions of substantially the same size, said two portions being then folded longitudinally substantially medially along the line 6, thus providing leaf portions 7, 8, 9 and 10. The work sheet B, in the embodiment herein shown, is approximately one-half the size of the sheet A and is folded longitudinally substantially medially to provide the portions 11 and 12.

The face side of the portion 7 of the sheet A may be provided with any suitable legends such as "Name", "Room", "Grade", "School", and "Date", said portion having openings 7ª adjacent the respective legends. The face side of the portion 7 may also bear instructions as to the manner in which the device is to be used. The face side of the portion 7 may also be provided with scoring means whereby the proficiency of the student may be recorded on the work sheet, such legends as "Addition", "Subtraction", "Multiplication", "Division" and "Fractions" being provided and the portion 7 having openings 7$^b$ adjacent the respective legends. The test problems are arranged on the face side of the portions 8, 9 and 10 of the sheet A, openings 8$^a$, 9$^a$ and 10$^a$ being provided in said portions adjacent the respective problems arranged thereon.

In making the device, the sheet A is first folded along the line 5. The work sheet B may then be inserted between the two folded half portions of the sheet A, and said portions and the work sheet may then be folded along the line 6 into the form shown in Fig. 1, substantially like a book is closed. If desired, the sheet A may be folded along line 5 and also along the line 6 before the work sheet is inserted.

When the device is handed out and is placed on the desk by the student, the only portion exposed to view is the face side of the portion 7. While waiting for the starting signal to be given by the examiner, the student may write his name, the name of the school, the room number, grade number and date on the work sheet by inserting a pencil point through the respective openings 7$^a$ provided in the portion 7. When the starting signal is given by the examiner, the device is unfolded, and the student commences solving the problems appearing on the face side of the portions 8 and 9, the answers to said problems being written on the work sheet by inserting the pencil point through the respective openings 8$^a$ and 9$^a$. After the problems appearing on the portions 8 and 9 have been solved, the student may fold the device into the form shown in Fig. 1, turn it over, and then solve the problem appearing on the face side of the portion 10. After the test has been completed the student's answers may be checked in any desired manner and the score or grade made by the student in the test may be written on the work sheet by inserting a pencil point through the respective openings 7$^b$.

The form shown in Figs. 3 and 4 of the drawings comprises a plurality of the devices shown in Fig. 1, superposed on each other, and preferably before being finally folded along the line 6. The several devices may be nested loosely together, in which case full size work sheets may be inserted between the respective portions bearing the test problems, or they may be fastened together by any desired means, for example, a staple 13; in the latter case the work sheets may be cut in two and the half sheets slipped between the respective leaves on each side of the book-like device. With this form of device a large number of test problems may be given to a student at one time and all of them may be concealed until the starting signal is given by the examiner.

A device embodying the principles of my invention is of very simple construction and is inexpensive to manufacture, its cost being only slightly more than the cost of printing the problems on an ordinary sheet of paper. The problems are concealed until the starting signal is given by the examiner, it being an easy matter for the examiner to detect any misuse of the device in this connection as readily as he can observe the opening of an ordinary book. The work sheets are maintained in a definite relationship with respect to the problems which is very desirable in a device of this kind. Any ordinary paper may be used for the work sheets, and, as both sides of the work sheets are used, it will be observed that the cost of giving tests with such devices to a large class of students is very small.

The word "problem" is used throughout the specification and claims to apply to anything to which the student is to provide a correct solution or answer whether the subject is in arithmetic, geography, history or some other branch of education.

While I have described my invention in certain preferred embodiments it is realized that there might be considerable deviation from these constructions and arrangements without departure from the principles of my invention; therefore, I do not wish to be understood as limiting the invention to the particular constructions and arrangements shown except only in so far as certain of the claims are so limited.

I claim:

1. An educational test device, comprising a sheet of material bearing on its face side a test problem, said sheet having an opening adjacent the problem through which the point of a writing instrument may be inserted, a work sheet adapted to be placed against the back of said first named sheet and on which the answer to said problem may be written, and means to maintain said work sheet in a definite relationship with respect to the first named sheet.

2. An educational test device, comprising a sheet of material bearing on its face side a plurality of test problems, said sheet having openings adjacent the respective problems, a work sheet adapted to be placed against the back of said first named sheet and on which the answers to said respective problems may be written, and means to maintain said work sheet in a definite relationship with respect to the first named sheet, said sheets being folded substantially medially into book form, whereby the problems may be concealed.

3. An educational test device, comprising two sheets of material placed back to back, means connecting said sheets, and a work sheet placed between the two first-named sheets, the face of one of said two first-named sheets bearing a test problem, said last-named sheet having an opening adjacent the problem through which the point of a writing instrument may be inserted, the other of said two first-named sheets serving to hold the work sheet in a definite relationship with respect to the problem while the answer to the problem is written.

4. An educational test device, comprising a sheet of material folded substantially medially so that the two portions thereof will lie back to back, and a work sheet placed between the two portions, the face of one of said portions bearing a test problem, said last-named portion having an opening adjacent the problem through which the point of a writing instrument may be inserted, the other of said portions serving to hold the work sheet in a definite relationship with respect to the problem while the answer to the problem is written.

5. An educational test device, comprising two sheets of material placed back to back, means connecting said sheets at one side, the face of one of said sheets bearing a plurality of test problems, said last named sheet having openings adjacent the respective problems, and a work sheet placed between the two first named sheets and on which the answers to the respective problems may be written, said three sheets being folded substantially medially into book form, whereby the problems may be concealed.

6. An educational test device, comprising a sheet of material folded substantially medially so that the two portions thereof will lie back to back, the face of one of said portions bearing a plurality of test problems, said last named portion having openings adjacent the respective problems, and a work sheet placed between the two portions and on which the answers to the respective problems may be written, said two portions and said last named sheet being folded substantially medially into book form, whereby the problems may be concealed.

7. An educational test device, comprising a plurality of leaves arranged in pairs and in book form, and work sheets adapted to be placed between the leaves of the respective pairs, said respective leaves having openings, said respective leaves having test problems on the face side thereof and arranged adjacent the respective openings, whereby the answers to the problems on the leaves of any particular pair may be written on the respective sides of the work sheet therebetween.

8. An educational test device, comprising two sheets of material placed back to back, means connecting said sheets at one side, the face of one of said sheets bearing a test problem, said last named sheet having an opening adjacent the problem, and a work sheet placed between the two first named sheets and on which the answer to the problem may be written, one of the two first named sheets having an opening and bearing a legend adjacent the same inviting the student to insert a pencil point through the last mentioned opening and write his name on the work sheets.

9. An educational test device, comprising two sheets of material placed back to back, means connecting said sheets at one side, the face of one of said sheets bearing a test problem, said last named sheet having an opening adjacent the problem, and a work sheet placed between the two first named sheets and on which the answer to the problem may be written, one of the two first named sheets having an opening and bearing a scoring legend adjacent the same whereby the examiner may insert a pencil point through the last mentioned opening and write the grade of the student on the work sheet.

JAMES E. McDADE.